United States Patent Office 3,110,580
Patented Nov. 12, 1963

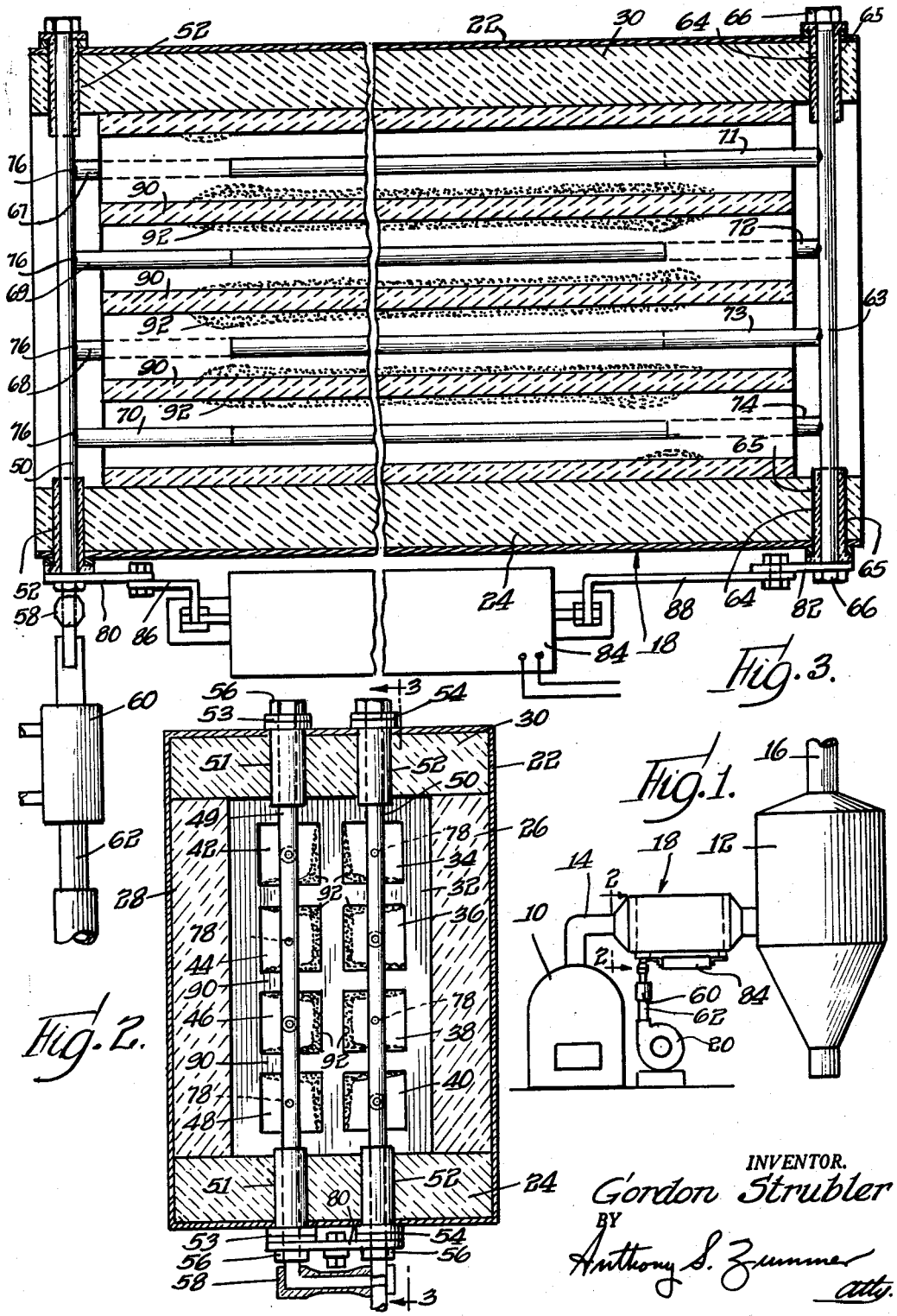

1

3,110,580
DEVICE FOR AGGLOMERATING MICROSCOPIC PARTICLES
Gordon Strubler, Chicago, Ill.
(1674 Kona St., Honolulu 14, Hawaii)
Filed Apr. 14, 1960, Ser. No. 22,218
2 Claims. (Cl. 55—120)

This invention relates to a novel device for agglomerating microscopic particles borne in a gaseous medium.

The problem of removing objectionable microscopic particles from a gaseous carrier is acute especially in the area of air pollution. It is generally well recognized that steam boilers and other oil or coal fired pieces of equipment usually produce smoke which is laden with fine particles of carbon. These fine particles of carbon are objectionable for many reasons. A primary objection is that it is dirt. The aforementioned microscopic particles of carbon carried in the smoke are usually much smaller than 25 microns so that these particles cannot be readily removed by mechanical equipment such as cyclones, but rather these particles readily pass through a cyclone and are belched forth from a smokestack.

It is recognized that if the fine particles of carbon could be agminated into large groups or clots, the large groups would either fall out of the supporting gaseous media or the large groups could be removed by mechanical devices such as cyclones. Electrostatic precipitation is used in some instances to agminate the microscopic particles.

Perhaps the best known device using electrostatic precipitation to agminate microscopic particles is the Cottrell type precipitator. Although the Cottrell precipitator is an effective device, it requires a high voltage direct current to operate. Since a high voltage direct current is usually not readily available for most industrial uses, the installation of the Cottrell precipitator is prohibitively expensive for many such installations. Therefore, it is one of the objects of the present invention to provide an apparatus for agglomerating microscopic particles borne in a gaseous medium which apparatus utilizes alternating current.

It is another object of the herein disclosed invention to provide a device for agglomerating microscopic particles which are borne in a gaseous medium which device is capable of agglomerating particles carried in black smoke.

It is a still further object of the herein disclosed invention to provide a device which agglomerates microscopic particles within itself and clears itself of said particles.

It is another object of the instant invention to provide a device for agglomerating microscopic particles which device is inexpensive to install and operate.

Other objects and uses of the herein disclosed invention will become readily apparent to those skilled in the art upon perusal of the appended specification and viewed in light of the drawings in which:

FIGURE 1 is a diagrammatic view of the instant invention installed in conjunction with a furnace and cyclone;

FIGURE 2 is a partial cross-sectional view of the device embodying the present invention taken on line 2—2 of FIGURE 1; and FIGURE 3 is a partial cross-sectional view taken on line 3—3 of FIGURE 2.

Referring now to the drawings and especially to FIGURE 1, a furnace 10 is connected to a cyclone 12 by breaching 14, and a stack 16 is connected to the top of the cyclone. An agglomerator 18 embodying the herein disclosed invention is positioned in breaching 14 between furnace 10 and cyclone 12. A blower 20 is connected to the agglomerator in a manner as will be described below.

2

The agglomerator 18 includes a steel casing 22 which is connected to the breaching 14 in a conventional manner to provide a conduit for smoke which flows from the furnace to the cyclone. The casing has a ceramic bottom 24 positioned on the bottom of the casing and a pair of ceramic sidewalls 26 and 28 are mounted inside the casing on top of the bottom 24. A ceramic top 30 is positioned on the uppermost sides of the walls 26 and 28. A flued ceramic block 32 is mounted in and fills the aperture defined by the aforementioned top, walls and bottom. The flued block 32 is a ceramic dielectric block which has in this instance eight square flue apertures of flues 34, 36, 38, 40, 42, 44, 46, and 48. The apertures extend longitudinally in the block parallel to each other so that each wall between adjacent apertures is uniform in thickness and has the same thickness as each other similar wall.

As may be seen in FIGURE 2 a pair of electrical conductive tubes 49 and 50 are positioned in mounting apertures 51 and 52 respectively which mounting apertures extend through the top and bottom ceramic members and the casing. Identical electrical insulators 53 and 54 are mounted in apertures 51 and 52 respectively which insulators 53 and 54 receive tubes 49 and 50 respectively to insulate the tubes from the steel casing 22. Each end of each of the tubes 49 and 50 is threaded to receive conventional nuts 56 which hold the tubes in place. The ends of the tubes 49 and 50 adjacent to top 30 are sealed for reasons which will become apparent hereinafter. The other end of each of the tubes is connected to an insulator divider 58 which provides an air flow path between the two tubes. The divider is in turn connected to a valve 60 which valve is controlled by a conventional electric timer which is not shown in this instance. The valve 60 is in turn connected to blower 20 by means of conduit 62, so that air under high pressure from the blower may be delivered to the two tubes 49 and 50.

A pair of electrical conductive frame rods 63, which are similar in construction to tubes 49 and 50, are positioned in mounting apertures 64. Mounting apertures 64 extend through bottom 24, top 30 and casing 22 as do mounting apertures 51 and 52. Each mounting aperture 64 has an electrical insulator 65, which is identical to electrical insulators 53 and 54, positioned therein and said insulators receive rods 63 to insulate the rods from steel shell 22. A conventional nut 66 threadedly mounted on each end of the rods 63 holds the rods in position as nuts 54 hold tubes 49 and 50 in position.

Each of the aforementioned parallel flues has a parallel electrode positioned in the center of each flue. A pair of electrodes 67 and 68 is mounted on tube 49 and the electrodes extend into flues 42 and 46, respectively. A second pair of electrodes 69 and 70 is mounted on tube 50 and the electrodes extend into flues 36 and 40 respectively. Aforementioned rods 63 are connected to and support a second group of electrodes 71, 72, 73 and 74, which electrodes are positioned in flues 34, 44, 38 and 48 respectively, and the second group of electrodes is partially coextensive with the first mentioned electrodes as may be seen in FIGURE 3.

As was mentioned above, air under pressure is delivered from the blower to tubes 49 and 50 which tubes have their uppermost ends sealed closed. These tubes 49 and 50 each have two air openings or orifices 76. Each orifice 76 is adjacent to the point where each electrode is attached to its respective tube so that the orifice is as closely aligned as possible with the axis of the respective flue. These orifices 76 are directed toward the respective flues of each of the immediately adjacent electrodes so that air blowing out of the orifices blows down the length of the respective flues. Each of the tubes 49 and 50 also has a pair of air openings or orifices 78. Each of the orifices 78 is aligned with an electrode mounted on one of the rods 63. The orifices 78 are also directed into the respective flues as are orifices 76 and for the same purpose as orifices 76.

Electrodes supported on one end are connected electrically together as are electrodes on the other end. An electrical bus bar 80 engages tubes 49 and 50 and connects the tubes electrically to connect electrically electrodes 67, 68, 69 and 70. As may be seen in FIGURE 2, nuts 56 hold the bus bar against two of the insulators 54 and in engagement with tubes 49 and 50. In a similar manner, electrical bus bar 82 is held in engagement with rods 63 by nuts 66 to connect electrically electrodes 71, 72, 73 and 74.

One side of the output of a stepup transformer 84 is connected to one group of electrodes and the other side of the transformer is connected to the other group of electrodes. A third bus bar 86 provides the electrical connection of one side of the output of transformer 84 with bus bar 80. The other side of the output is electrically connected to bus bar 82 by means of bus bar 88. The transformer which in this instance is a 200 to 1 stepup transformer is connected to a conventional source of 110 volt alternating current which source is not shown.

When a fire is going in furnace 10 so that black smoke is produced, the black producing microscopic particles are removed from the combustion products by means of the instant device using the hereindisclosed method. Smoke which contains carbon particles having a magnitude less than 25 microns and being in the vicinity of 5 microns is conducted from the furnace to the agglomerator. The smoke enters the agglomerator at the left end as viewed in FIGURE 3 so that the smoke flows through the flues from left to right as seen in that figure. As the smoke flows through the flues, a high voltage alternating electromagnetic field is impressed between adjacent electrodes which are connected to opposite sides of transformer 84. Inasmuch as the transformer is connected to an ordinary 110 volt source, the potential on the output side of the transformer is between 20,000 and 22,000 volts. A dielectric wall member 90 is equidistantly positioned between the adjacent electrodes. This dielectric wall member is a part of the flued block 32 which receives all of the electrodes.

It has been observed that the microscopic particles 92 agglomerate on the dielectric walls of the flue as shown in FIGURE 3. That is, the agminated particles are gathered between the coextensive portions of the electrodes, but the particles are concentrated at the ends of each of the electrodes where it appears that the density of the electromagnetic field is greater than at the coextensive portions of the electrodes.

Since the agminated particles adhere to the sidewalls of the flues, the flues would become clogged if the particles are not removed. One convenient method of removing the agminated particles periodically is blowing the clusters of particles out of the flues. The aforementioned blower 20 is in constant operation providing air under pressure to conduit 62. Valve 60 which is controlled by an electric timer periodically allows air which is at 75 p.s.i. to enter divider 58 and then tubes 49 and 50. Since the ends of the tubes are closed, the air leaves the tubes through orifices 76 and 78 so that the air rushes down the length of the flues to blow out the particle clusters. The particle clusters are not carried out of the stack 16 because the cyclone 12 is able to separate the clusters from the gaseous carrying media but it is not able to separate the sole microscopic particles. Although a cyclone is used in this instance, the instant device is effective when there is no cyclone used.

The instant apparatus is used on a 30 second cycle. The valve 60 remains closed for 28 seconds during which time the particles adhere to the dielectric walls. Then, the valve is opened for 2 seconds during which time the flues are cleared of particles.

In one instance where the instant invention has been used, the results have been very good. A fire which produced black smoke was built in furnace 10 and black smoke came out of stack 16. A 110 volt alternating current was supplied to transformer 84 and the smoke cleared. After the run had ended, the cyclone was inspected and lamp black was found in and removed from the cyclone.

Although a specific embodiment of the hereindisclosed invention has been described, it is readily apparent that those skilled in the art will make other uses of the present invention without departing from the spirit and scope of the invention. Therefore, this invention is to be limited only by the appended claims.

What is claimed is:

1. A device of the character described for agglomerating microscopic particles carried in a gaseous medium, comprising, a casing, a ceramic dielectric block positioned within said casing, said block having a number of flues extending through said block, a group of electrodes positioned in one end of said block and extending toward the other end, said group of electrodes being equal in number to approximately one-half the number of flues, each of said electrodes being positioned in its respective flue, a second group of electrodes positioned in the other end of the block and extending toward the first mentioned group of electrodes, said second group of electrodes being equal in number to approximately one-half the number of flues, each of the electrodes of said second group being positioned in its respective flue, means for impressing a high voltage alternating electrical current between the first-mentioned group of electrodes and the second group of electrodes and means permanently positioned adjacent to the flues for blowing clear agminated microscopic particles from the flues while the high voltage alternating electrical current is impressed between the first-mentioned group of electrodes and the second group of electrodes.

2. A device of the character described for agglomerating microscopic particles carried in a gaseous medium, comprising, a casing, a ceramic dielectric block positioned within said casing, said block having a number of flues extending through said block, a first group of electrodes positioned in one end of said block and extending toward the other end, said first group of electrodes being equal in number to approximately one-half the number of flues, each of said electrodes being positioned in its respective flue, support means for said first group of electrodes, a second group of electrodes positioned in the other end of the block and extending toward the first mentioned group of electrodes, said second group of electrodes being equal in number to approximately one-half the number of flues, support means for said second group of electrodes, each of the electrodes of said second group being positioned in its respective flue, means for impressing a high voltage alternating electrical current between the first-mentioned group of electrodes and the second group of electrodes, said support means for said first and second group of electrodes including blowing means positioned adjacent to the flues for blowing clear agminated microscopic particles from the flues while the high voltage alternating electrical current is impressed between the first-mentioned group of electrodes and the second group of electrodes.

References Cited in the file of this patent

UNITED STATES PATENTS

| | | |
|---|---|---|
| 871,652 | Ward | Nov. 19, 1907 |
| 1,130,212 | Steere | Mar. 2, 1915 |
| 1,787,955 | Rosecrans | Jan. 6, 1931 |
| 1,992,974 | Thompson | Mar. 5, 1935 |

FOREIGN PATENTS

| | | |
|---|---|---|
| 467,267 | France | Mar. 26, 1914 |